(12) United States Patent
Asturias et al.

(10) Patent No.: US 8,499,563 B2
(45) Date of Patent: Aug. 6, 2013

(54) SYSTEM FOR GENERATING AND TRANSPORTING ELECTRIC POWER FROM HYDROTHERMAL VENTS

(76) Inventors: Daniel Asturias, Austin, TX (US); Isaac Harwell, Houston, TX (US)

( * ) Notice: Subject to any disclaimer, the term of this patent is extended or adjusted under 35 U.S.C. 154(b) by 323 days.

(21) Appl. No.: 12/954,193

(22) Filed: Nov. 24, 2010

(65) Prior Publication Data

US 2011/0121583 A1   May 26, 2011

Related U.S. Application Data

(60) Provisional application No. 61/264,339, filed on Nov. 25, 2009.

(51) Int. Cl.
*F03G 7/00* (2006.01)

(52) U.S. Cl.
USPC .............................................. 60/721; 310/311

(58) Field of Classification Search
USPC .......................................................... 290/1 R
See application file for complete search history.

(56) References Cited

U.S. PATENT DOCUMENTS

| | | | | |
|---|---|---|---|---|
| 4,114,380 A | * | 9/1978 | Ceperley | 60/721 |
| 4,355,517 A | * | 10/1982 | Ceperley | 60/721 |
| 5,901,556 A | * | 5/1999 | Hofler | 62/6 |
| 6,032,464 A | * | 3/2000 | Swift et al. | 60/520 |
| 6,637,211 B1 | * | 10/2003 | Swift et al. | 62/6 |
| 6,732,515 B1 | * | 5/2004 | Weiland et al. | 60/520 |
| 7,081,699 B2 | * | 7/2006 | Keolian et al. | 310/311 |
| 8,227,928 B2 | * | 7/2012 | Garner et al. | 290/1 R |
| 2003/0188541 A1 | * | 10/2003 | Howard | 62/6 |
| 2003/0192324 A1 | * | 10/2003 | Smith et al. | 62/6 |
| 2005/0067005 A1 | * | 3/2005 | Van Der Spek | 136/205 |
| 2006/0266041 A1 | * | 11/2006 | Fellows | 60/645 |
| 2008/0060364 A1 | * | 3/2008 | Watanabe et al. | 62/6 |
| 2009/0047072 A1 | * | 2/2009 | Reid et al. | 405/159 |
| 2009/0096322 A1 | * | 4/2009 | Peacock | 310/319 |

FOREIGN PATENT DOCUMENTS

| | | | |
|---|---|---|---|
| JP | 2006009579 A | * | 1/2006 |
| WO | WO 03049491 A2 | * | 6/2003 |
| WO | WO 2011022027 A2 | * | 2/2011 |

* cited by examiner

*Primary Examiner* — Joseph Waks
(74) *Attorney, Agent, or Firm* — Arent Fox LLP

(57) ABSTRACT

An electric generator includes a channel for directing a flow of a first fluid and a thermoacoustic resonance chamber that penetrates the channel, including a first heat exchanger inside the channel and a second heat exchanger outside the channel, wherein the thermoacoustic resonance chamber has a toroidal shape configured to enclose a second fluid adapted to create a resonance of and carry an acoustic pressure wave to transfer heat between the first heat exchanger and the second heat exchanger. The thermoacoustic resonance chamber includes a plurality of channels to provide a plurality of resonance cavities capable of supporting standing thermoacoustic waves around the toroidal shape. The plurality of channels are configured to partition the thermoacoustic resonance chamber into a plurality of tubular channels extending around the toroidal shape.

17 Claims, 8 Drawing Sheets

CROSS-SECTION

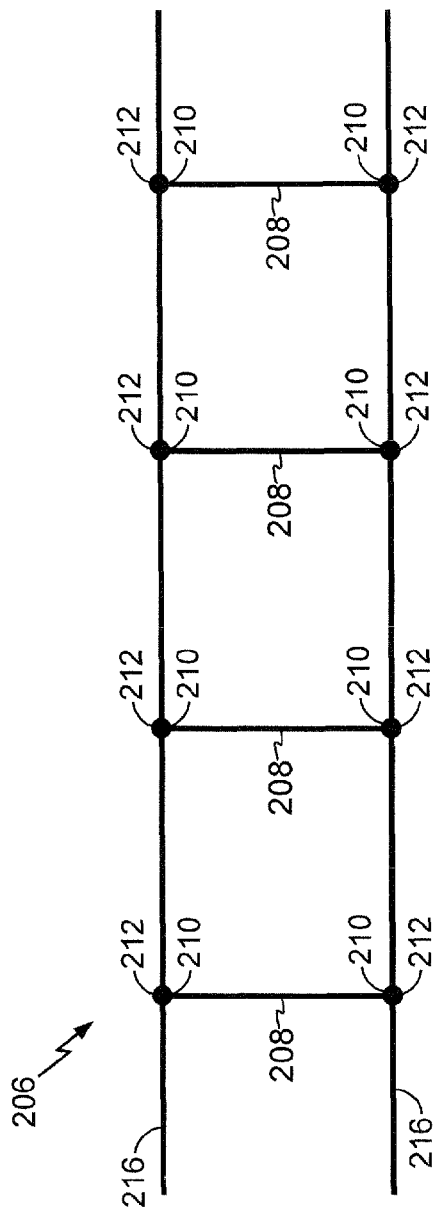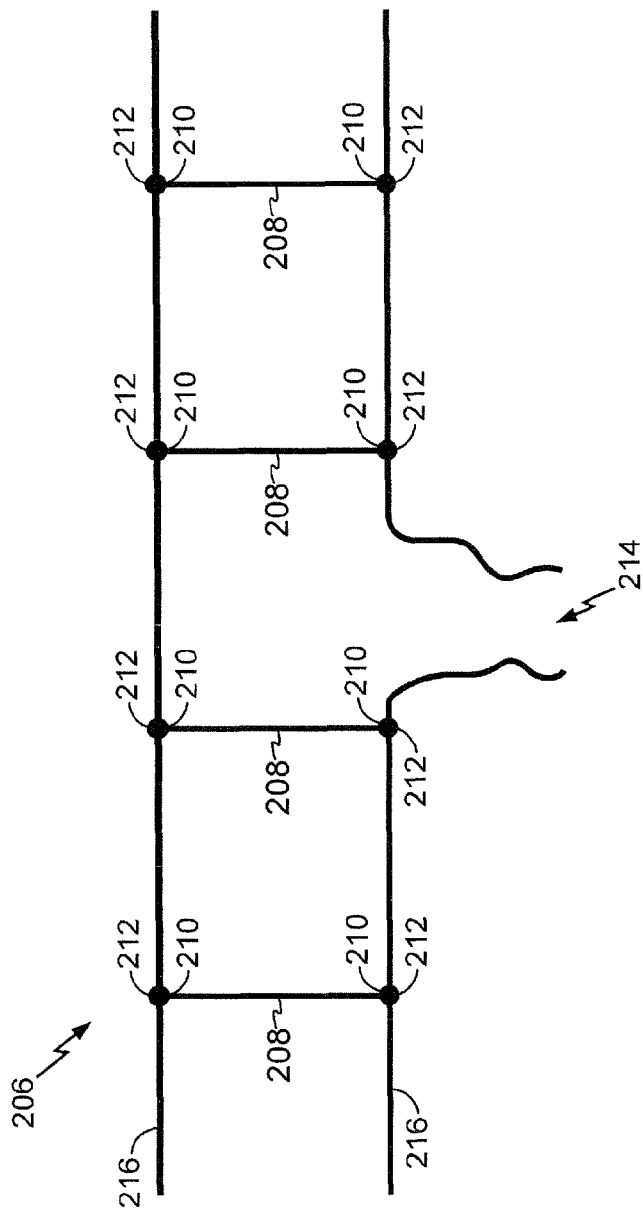

SYSTEM FOR GENERATING AND TRANSPORTING ELECTRIC POWER FROM HYDROTHERMAL VENTS

CROSS-REFERENCE TO RELATED APPLICATIONS

This application claims priority to and the benefit of provisional patent application No. 61/264,339, filed in the United States Patent and Trademark Office on Nov. 25, 2009, the entire content of which is incorporated herein by reference.

BACKGROUND

1. Field

The following description relates generally to a system for converting thermal energy into electric energy, and in particular, a system for utilizing the thermoacoustic effect to convert a thermal gradient into electric energy.

2. Background

Hydrothermal vents are common natural phenomena where geothermally heated water emanates from the earth. Some types of hydrothermal vents are located on the sea floor, frequently at mid-ocean ridges at the boundaries between tectonic plates. FIG. 1 is a simplified illustration showing a certain type of hydrothermal vent. Here, ambient sea water 2 is drawn into the sea floor 4. Due to subsurface magma, at depths the sea floor includes heated layers 6, wherein the seawater drawn into the sea floor is heated to high temperatures and expelled through a hydrothermal vent 8 back into the ocean. In some hydrothermal vents, due to a buildup of minerals that the seawater picked up while being drawn through the sea floor, a chimney 10 may occur.

Due to this natural phenomenon, a large, naturally occurring temperature gradient is created where superheated hydrothermal fluid 12 issues into cold sea water. For this reason, there has been interest in harvesting energy from undersea hydrothermal vents. However, a number of practical difficulties have prevented any large-scale generation of energy at undersea hydrothermal vents. For example, the vents are highly inaccessible, typically occurring at remote locations under thousands of meters of water. Further, when expelled from the vents, the hydrothermal fluid generally contains a concentration of minerals and various compounds and is frequently acidic and corrosive, potentially destroying most types of conventional electric generating equipment in short order. Moreover, even the primary feature that makes these vents desirable, that is, the extreme thermal gradient between the hydrothermal fluid and the surrounding sea water (e.g., a temperature change from about 350° C. to 2° C. in a distance of just a few feet) is so great as to make the use of conventional heat pumps, stirling engines, or steam turbines difficult or impossible. In addition, these devices each have many moving parts and other issues that reduce their reliability, resulting in the need for relatively frequent maintenance, which is much more difficult to perform at the deepwater locations where the hydrothermal vents occur.

SUMMARY

In various representative aspects, the instant disclosure provides for a system, an electric generator, and a method for generating and/or distributing electric energy based on hydrothermal energy at undersea hydrothermal vents.

In one example, an electric generator utilizes the thermoacoustic effect to organize and extract usable energy from the natural heat gradient present between hydrothermal fluid issuing from a hydrothermal vent and ambient sea water by creating an acoustic wave in a working fluid inside a thermoacoustic resonance chamber. The acoustic energy is converted to electric energy by a piezoelectric transducer that resonates with the acoustic wave, and is then transported to land through a network of power cables. Unlike other the heat engines like steam turbines or sterling engines, the thermoacoustic generator disclosed herein may have no moving parts, in the sense that there are generally no spinning or sliding components. As the system is more robust, it is less likely to require frequent maintenance visits, and therefore enables the extraction of deep sea hydrothermal energy into a viable and cost effective renewable energy alternative.

In one aspect, the disclosure provides an electric generator including a channel for directing a flow of a first fluid, e.g., hydrothermal fluid issuing from an undersea hydrothermal vent, and a thermoacoustic resonance chamber that penetrates the channel. The thermoacoustic resonance chamber is configured to have a first heat exchanger inside the channel for absorbing heat energy from the superheated hydrothermal fluid, and a second heat exchanger outside the channel for moving the heat energy, e.g., into ambient sea water.

Another aspect of the disclosure provides a method of generating electric energy. Here, a thermoacoustic resonance chamber is provided at an undersea hydrothermal vent. The thermoacoustic resonance chamber includes a first heat exchanger thermally coupled to a hydrothermal fluid emanating from the hydrothermal vent, and a second heat exchanger thermally coupled to ambient sea water. A standing acoustic wave is set up in the thermoacoustic resonance chamber, and the acoustic energy corresponding to the standing acoustic wave is converted into electric energy utilizing a piezoelectric transducer.

Another aspect of the disclosure provides an apparatus for generating electric energy. The apparatus includes means for generating a standing thermoacoustic wave between a hydrothermal vent and sea water, and means for converting acoustic energy from the thermoacoustic wave into electric energy.

These and other aspects are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

FIGS. 8A and 8B are schematic diagrams illustrating a transmission line in accordance with an aspect of the disclosure.

DETAILED DESCRIPTION

Figure 1:
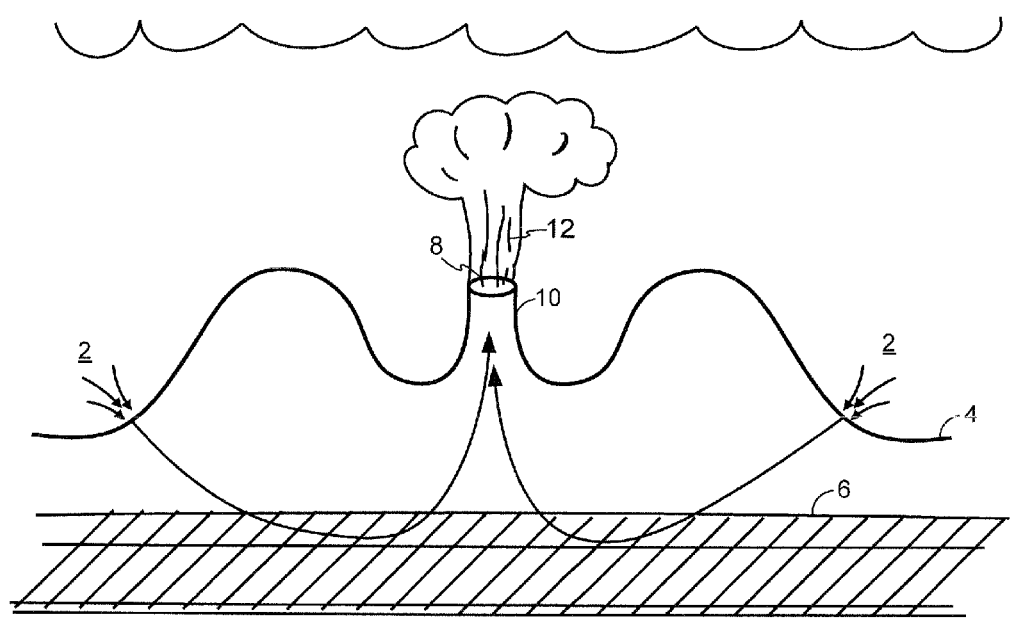
FIG. 1 is a simplified diagram illustrating a natural undersea hydrothermal vent.

Elements and steps in the figures are illustrated for simplicity and clarity and have not necessarily been rendered according to any particular sequence. For example, steps that may be performed concurrently or in different order are illustrated in the figures to help to improve the understanding of various aspects of the disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the other element or be indirectly on the other element with one or more intervening elements interposed therebetween. Further, in the context of the present application, when an element is referred to as being "connected" or "coupled" to another element, it can be directly connected or coupled to the other element or be indirectly connected or coupled to the other element with one or more intervening elements interposed therebetween. Like reference numerals designate like elements throughout the specification.

Figure 2:
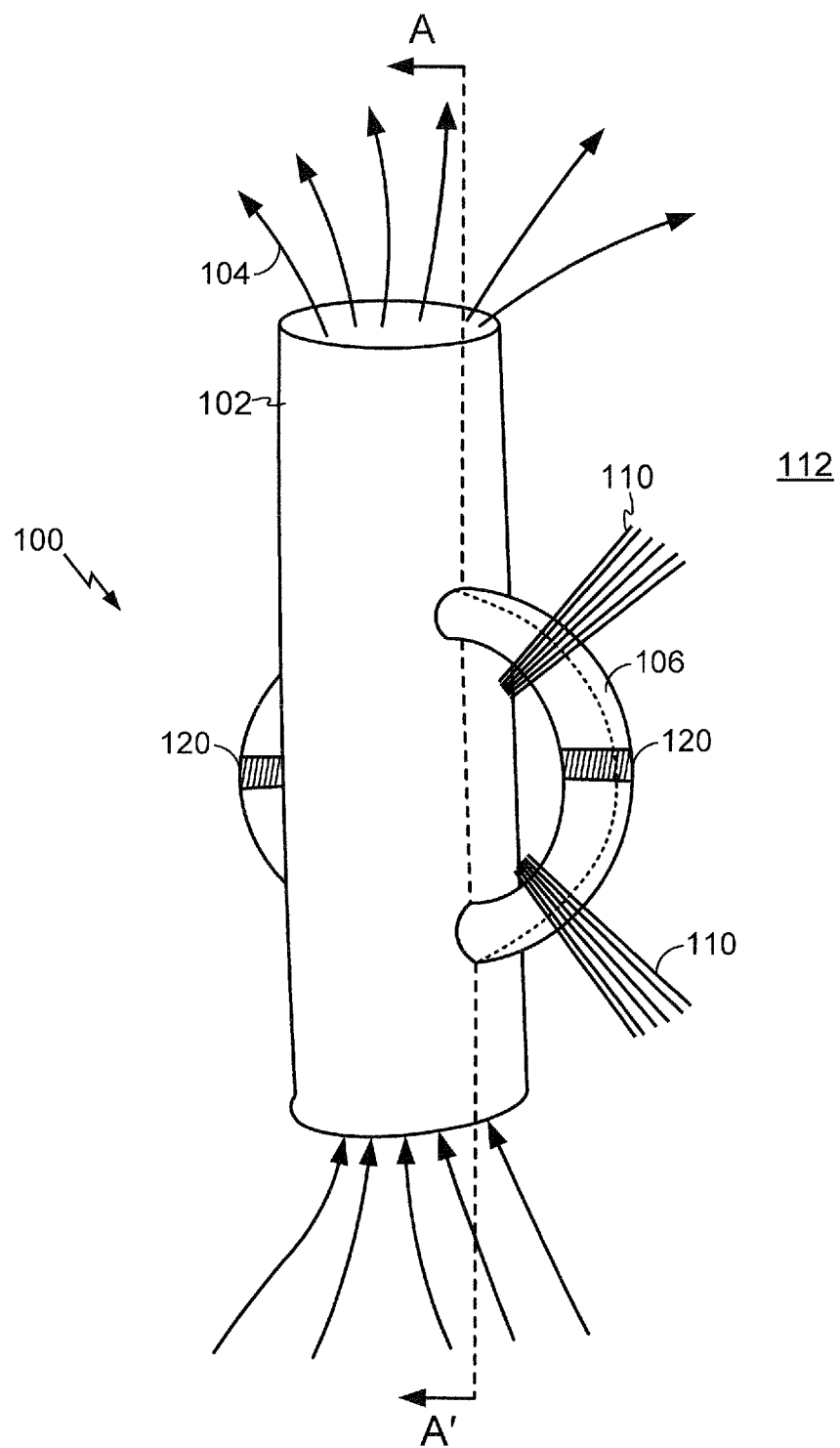
FIG. 2 is a perspective view showing an electric generator in accordance with an aspect of the disclosure.

A detailed description of an exemplary application, namely a system for converting hydrothermal energy at an undersea hydrothermal vent into electric energy, is provided as a specific enabling disclosure that may be generalized to any application of the disclosed system, device and method for converting thermal energy into electric energy in accordance with various embodiments of the present invention. As generally depicted in FIG. 2, an exemplary embodiment of the present invention provides a channel 102 for directing the flow of a fluid 104, and a thermoacoustic resonance chamber 106 that penetrates the channel 102. The thermoacoustic resonance chamber 106 includes at least one first heat exchanger 108 inside the channel 102 and at least one second heat exchanger 110 outside the channel 110. In this way, thermal energy from the hot fluid 104 flowing through the channel 102 may be transferred from the first heat exchanger 108 to the second heat exchanger 110, and thereby, into an ambient fluid 112 coupled to the second heat exchanger 110.

The vent channel 102 directs the hydrothermal fluid 12 to the hot side heat exchangers 108. As the hydrothermal fluid 12 comes in contact with the ambient seawater 2, it cools quickly. To prevent a loss of heat, the vent channel 102 may substantially seal up against the hydrothermal vent 8, to reduce or prevent mixing of the sea water 2 with the hydrothermal fluid 12. In an exemplary embodiment, the vent channel 102 may be heavily insulated to reduce or prevent heat from being lost to the sea water 2, ensuring that it retains its heat as it passes the hot side heat exchangers 108. The outer shell of the vent channel 102 may be made of a suitable material to give it strength and resist the corrosive sea water, while the inside may be coated in a corrosion resistant material such as a nickel alloy to protect it from the hydrothermal fluid 12. The vent channel 102 may be open at both ends, to allow the hydrothermal fluid 12 to flow past the hot side heat exchanger 108 and reach the sea water 2 without substantially obstructing the flow.

The thermoacoustic resonance chamber 106 may enclose a working fluid 114 capable of carrying an acoustic pressure wave to transfer the heat energy from the first heat exchanger 108 to the second heat exchanger 110. That is, the thermoacoustic resonance chamber 106 may have a toroidal shape configured to create a resonance of an acoustic pressure wave within a working fluid 114 in the chamber. A "stack" 138 may partition the thermoacoustic resonance chamber 106 into a number of generally tubular channels 118, arcing around the inside of the toroid. At least one piezoelectric transducer 120 may be suitably placed within the thermoacoustic resonance chamber 106 to harness the vibration energy generated by the acoustic pressure wave and convert it into usable electric energy.

The thermoacoustic effect is a physical phenomenon resulting from the thermal properties of a gas such as the working fluid 114 and the geometry of the thermoacoustic resonance chamber 106. In general, in a fixed volume, heating causes a gas to expand, and cooling causes the gas to contract or compress. By the same token, compression of a gas causes it to heat, while expansion or decompression of a gas causes it to cool. Thus, within the thermoacoustic resonance chamber, when heat transfers from the first heat exchanger 108 to the working fluid 114, a localized expansion of the working fluid 114 occurs. This localized expansion travels through the working fluid 114 as an acoustic pressure wave. Because pressure is ideally proportional to temperature, there is a small temperature fluctuation in the working fluid 114 where the acoustic pressure wave passes. During the time $t=1/(\pi f)$, where f is the frequency of the acoustic pressure wave, the distance that heat is able to diffuse through the working fluid 114 is determined by the thermal penetration depth $\delta k$, defined as $\delta k=\sqrt{(2\kappa/(\pi f \rho cp))}$, where $\kappa$ is the thermal conductivity of the working fluid 114, $\rho$ is its density, and cp is its specific heat at a constant pressure. As this thermal penetration depth $\delta k$ is usually quite small, the purpose of the stack 138 is to partition the large cross-sectional area of the thermoacoustic resonance chamber 106 into a number of relatively narrow tubular channels 118 extending around the thermoacoustic resonance chamber 106 in order for the thermoacoustic effect to manifest itself.

When the working fluid 114 is confined to a chamber having suitable dimensions for a resonance effect, a standing acoustic pressure wave may be generated in the working fluid 114. That is, as a temperature gradient across the stack 138 is created, a self-sustaining oscillation is formed in the channels of the stack 138, which carries heat from the hot side to the cold side, and in turn is amplified. As this wave travels through the thermoacoustic resonance chamber, it resonates until it becomes a powerful acoustic pressure wave. The frequency of the wave depends on the length of the resonator, with the specific harmonic(s) of the wave determined by the length and placement of the stack 138 in relation to other components inside the resonator, and in part by the non-linear effects that may begin to exhibit themselves at higher amplitudes. Here, as heat continues to be transferred from the first heat exchanger 108 to the working fluid 114, the pressure wave moves the heat within the working fluid 114 and the stack 138 away from the first heat exchanger 108. Suitable placement of the second heat exchanger 110 enables this heat to be removed from the working fluid 114 and the stack 138. Moreover, a plurality of first heat exchangers 108 and/or second heat exchangers 110 may be suitably located to improve the transfer of the heat through the resonance chamber 106.

In an exemplary embodiment, a portion of the stack 138 may extend around one-eighth of the circumference of the toroidal thermoacoustic resonance chamber 106 to induce the second harmonic.

The stack 138 may be constructed out of any suitable material capable of being formed into one of the above-described shapes and withstanding the heat gradient (such as, but not limited to stainless steel or ceramic).

In some examples, in addition to or in the place of the hexagonal or generally round tubular channels 118 described above, the stack may include a set of parallel plates to form the stack's channels, with the separation distance between the plates being a multiple of the thermal penetration depth. Here, the exact distance between the plates may vary in accordance with other parameters of the machine (for example the frequency, the choice of the working fluid, etc). In some examples, the stack may include a set of parallel solid tubes or pins, with an open space between them within the thermoacoustic resonance chamber 106. Those skilled in the art will understand that there are numerous equivalent configurations of the stack within the spirit and scope of the instant disclosure.

Figure 3:
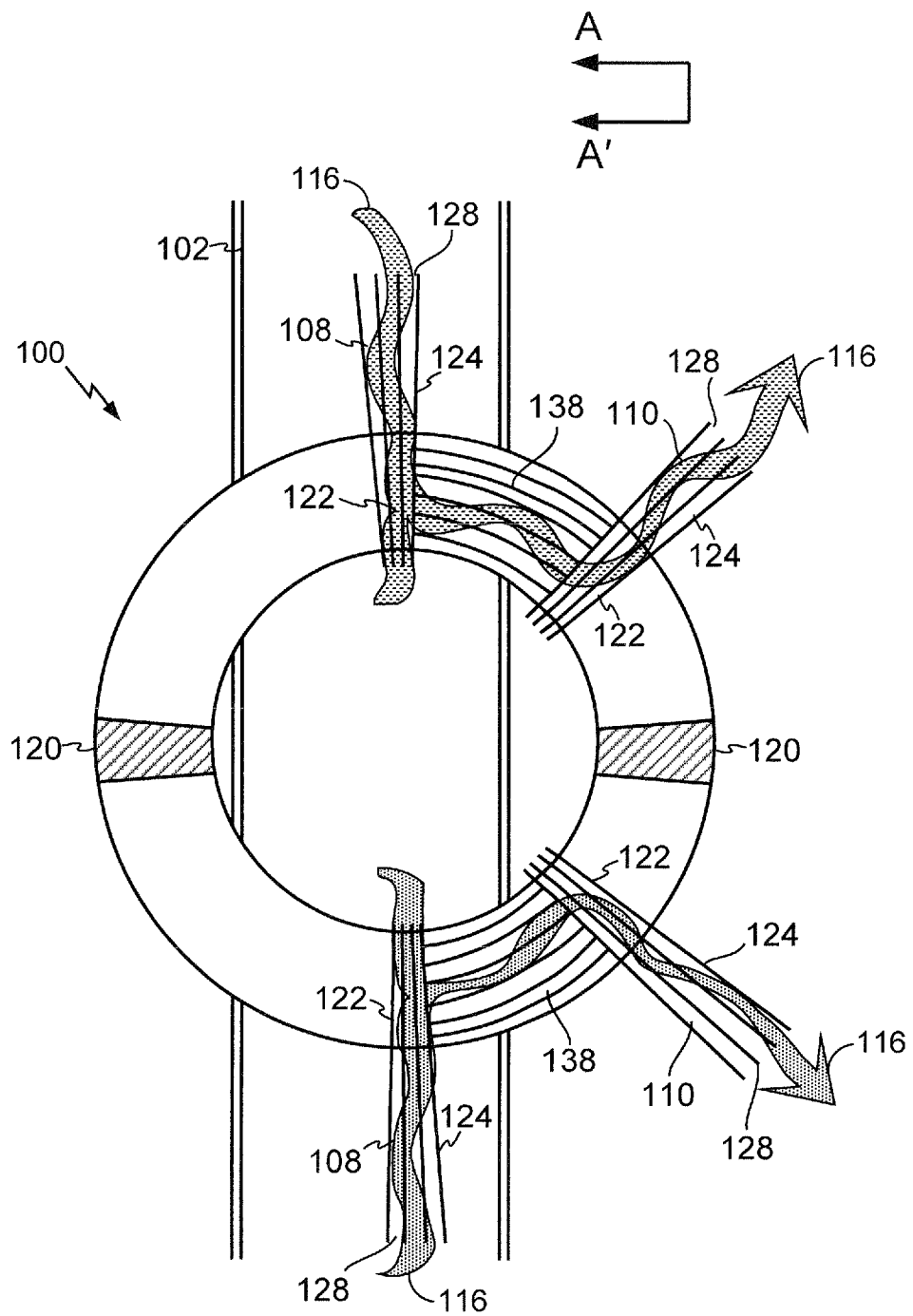
FIG. 3 is a cross-section of the electric generator of FIG. 2.

The thermoacoustic resonance chamber 106 includes the ring-shaped portion of this embodiment of the generator. In an exemplary embodiment, the chamber is a generally hollow, toroidal structure filled with a suitable working fluid 114 (such as, but not limited to, helium or other inert gas) in which the acoustic pressure waves may propagate. In an exemplary embodiment, there may be two sets of stacks 138 and heat exchangers 108, 110, with each set comprised of a stack with one heat exchanger on either side, as illustrated in cross-section in FIG. 3. These sets may be positioned inside of the thermoacoustic resonance chamber 106 so that the hot side heat exchangers 108 of each set are approximately opposite each other. The thermoacoustic resonance chamber 106 may intersect the vent channel 102 so that the hot side heat exchangers 108 are inside the vent channel 102, while the cold side heat exchangers 110 are outside the vent channel 102. The piezoelectric transducers 120 may be placed opposite each other, approximately halfway between the two stacks 138, as seen in FIG. 3. Along with containing the working fluid 114, the thermoacoustic resonance chamber 106 may also act as a pressure vessel. While the static pressure of the working fluid 114 is at equilibrium with the pressure of the outside environment, the acoustic pressure wave may create large pressure fluctuations at the pressure antinodes of the system. As a pressure vessel, the thermoacoustic resonance chamber 106 may be made of a material that is strong enough to withstand those forces, as well as resist the corrosive effects of the ambient sea water 2 and hydrothermal fluid 12, such as, but not limited to, one of various titanium alloys. In addition, the thermoacoustic resonance chamber 106 may include a layer of insulation to ensure that heat from inside the vent channel 102 or the hot side of the stacks 138 is not lost through conduction.

Figure 4:
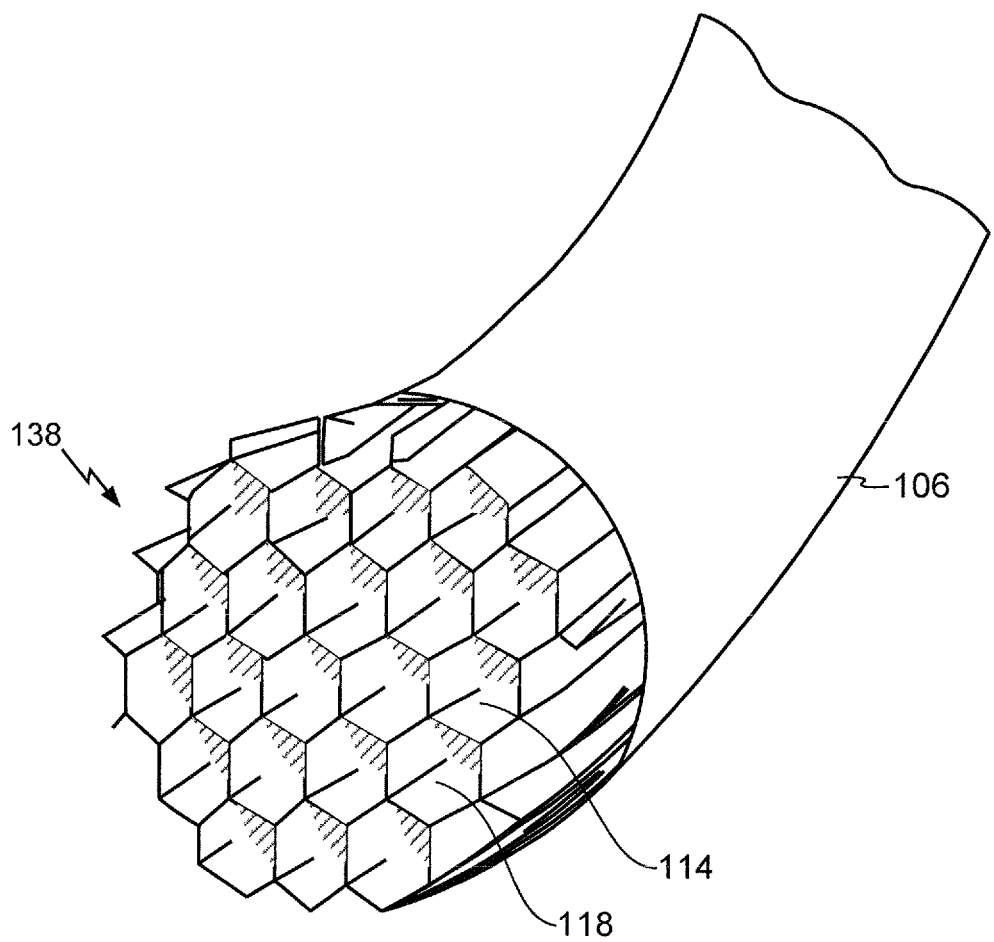
FIG. 4 is a partial cross-section showing a detail of a stack in a thermoacoustic resonance chamber in accordance with an aspect of the disclosure.
Figure 5:
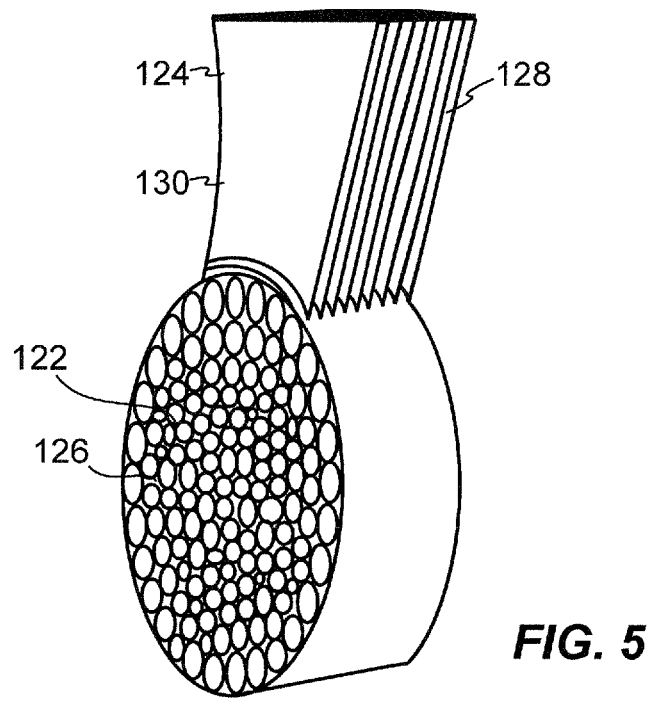
FIG. 5 is a diagram illustrating a heat exchanger in accordance with an aspect of the disclosure.

FIG. 5 is an illustration of an exemplary heat exchanger. The first and second heat exchangers 108, 110 are in charge of moving heat 116 to and from the ends of the stacks 138. In an exemplary embodiment, each heat exchanger 108, 110 may include two portions: a first, internal portion 122, and a second, external portion 124. The internal portion 122 may resemble the geometry of the stack 138, so that it can make contact without blocking the channels. For example, when the stack 138 includes channels 118 having hexagonal cross-section as illustrated in FIG. 4, the internal portion 122 may have pores 126 having a hexagonal cross-section that may align with the tubular channels 118. The internal portion 122 of the heat exchanger may connect through the shell of the thermoacoustic resonance chamber 106 to the outside portion 124, which may be a series of fins 128 over which either the hydrothermal fluid 12 or the ambient sea water 2 washes over, depending on whether the respective heat exchanger is a hot side heat exchanger or a cold side heat exchanger.

In an exemplary embodiment, the heat exchangers may be constructed of a solid piece of a suitable material (e.g., one with a high thermal conductivity, such as, but not limited to, copper), and the fins 128 may be coated with a corrosion resistant material 130 (such as, but not limited to, nickel alloys).

The hot side heat exchangers may be subjected to further stress, as the hydrothermal fluid 12 may carry a bit of sediment and may have a large dissolved mineral content, both of which could gum up the heat exchangers. In an exemplary embodiment, to ensure that these heat exchangers stay clean, they may be slightly less mechanically damped than the cold side heat exchangers, causing them to vibrate slightly as some of the acoustic power is dissipated through them. This, along with the non-reactive coating, may make the heat exchangers substantially self-cleaning and reduce or eliminate clogging.

Returning to FIG. 3, the piezoelectric transducer 120 may be located within the thermoacoustic resonance chamber 106, for example, at a pressure antinode of the standing pressure waves in the working fluid 114. Here, the acoustic pressure waves create a vibration, causing a strain across the piezoelectric transducer 120 and generating an electric potential that may be harvested and sent by a transmission line as useful electric energy.

A piezoelectric crystal produces electric power in response to changes in stress along the crystal's face. The placement of a piezoelectric transducer 120 at a pressure antinode, the region of the largest pressure differences in the thermoacoustic waveform, allows for a direct transition from acoustic to electric power, without having to resort to systems with moving parts. The electric power may then be rectified, and sent to the power line system. The piezoelectric transducer 120 may be constructed of most piezoelectric materials, such as, but not limited to, quartz, barium titanate, lead zirconate titanate, etc.

Figure 6:
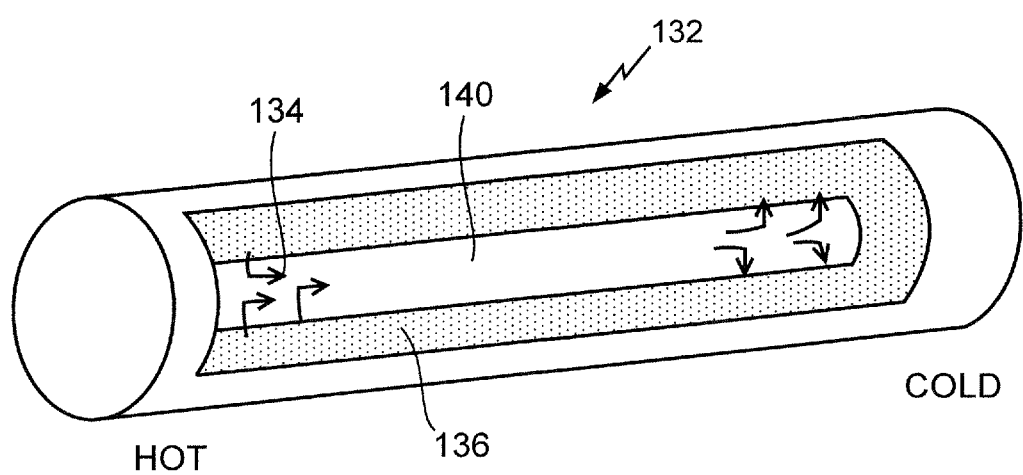
FIG. 6 is a diagram illustrating a heat pipe in accordance with an aspect of the disclosure.

In an exemplary embodiment, at least one of the heat exchangers 108, 110 may include a heat pipe 132. FIG. 6 illustrates an exemplary heat pipe 132 including a thermally conductive material 134 that may undergo a phase change, e.g., from a liquid to a gas or from a gas to a liquid, to efficiently transfer heat. For example, the heat pipe 132 may include a porous portion 136 and/or one or more channels into which the thermally conductive material 134 may be placed in its liquid phase. At the hot side of the heat pipe 132, this thermally conductive material 134 may evaporate to its gaseous phase, and move along an internal chamber 140 towards the cold side of the heat pipe 132. At the cold side, the gaseous thermally conductive material 134 may condense back into its liquid phase, entering back into the porous portion 136 or the channels. Here, the porous portion 136/channels may be configured to draw the thermally conductive material 134 back towards the hot side of the heat pipe 132 by way of a capillary action, where the process may repeat itself. In this way, a transfer of heat from a hot side of a heat exchanger to its cold side may be improved.

Figure 7:
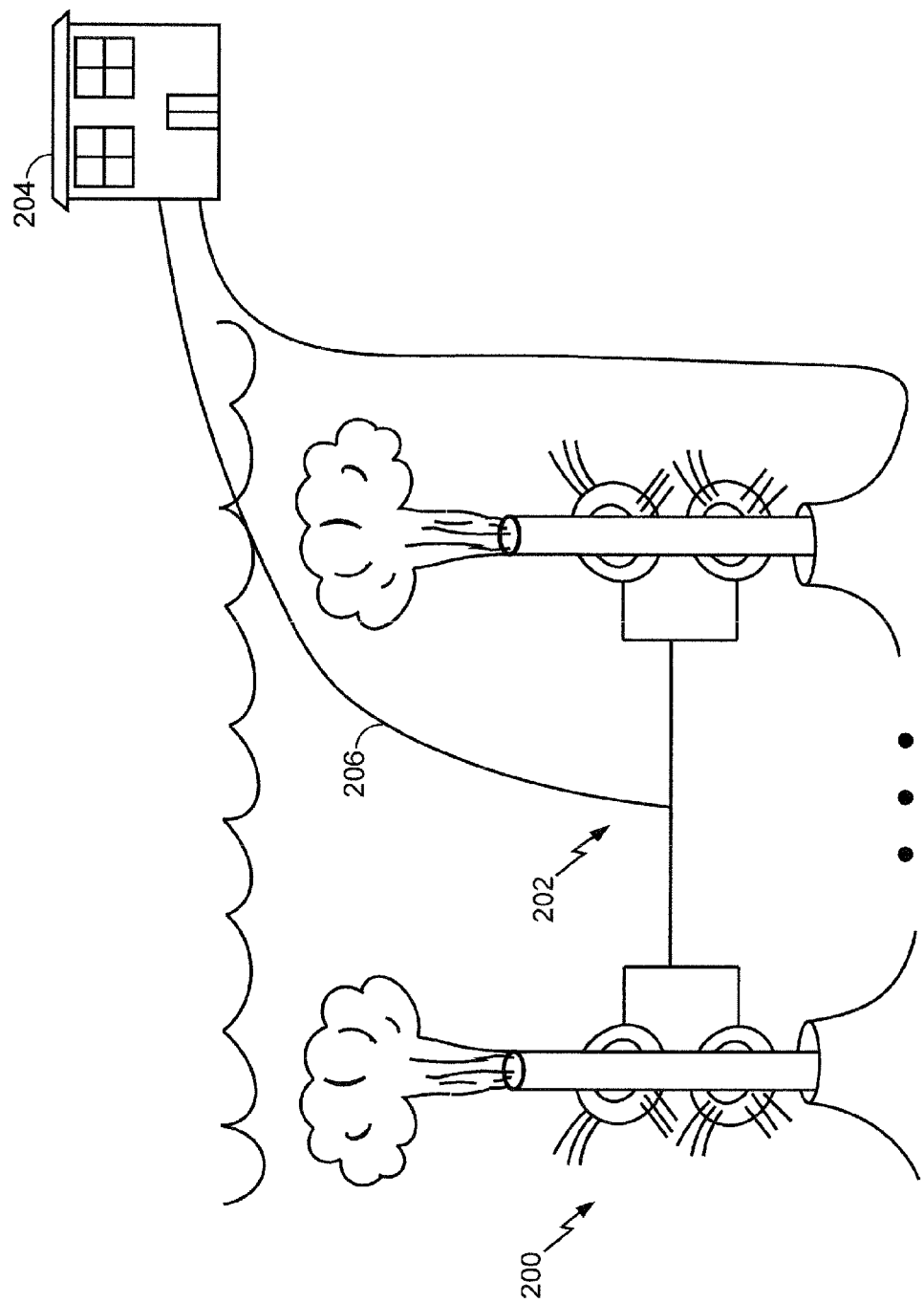
FIG. 7 is a simplified schematic diagram of a system for generating and distributing electric energy in accordance with an aspect of the disclosure.

FIG. 7 is a simplified diagram illustrating a power distribution system 200 in accordance with an exemplary aspect of the disclosure. Here, the system 200 includes a plurality of electric generators 100 in accordance with the above description, and a power line network 202 to transmit the electric energy along a transmission line 206 from the electric generators 100 to a remote location 204.

FIGS. 8A and 8B are simplified illustrations of the transmission line 206. In an exemplary embodiment, the transmission line 206 may include a number of main lines 216 (e.g., two main lines 216) and a number of sub-connectors 208 for coupling together at least two of the plurality of main lines 216.

Utilizing this configuration, the power line system 200 may provide a plurality of alternate paths for power to flow should any individual line be damaged. For example, at each junction 212 between a main line 216 and a sub-connector 208, a monitoring device 210 may be arranged. Here, in the event of a broken line 214 as illustrated in FIG. 8B, these monitoring devices 210 may report the segment at which the break 214 occurred. One example of a monitoring device 210 capable of these operations is the NI USB-6009 Data Acquisition (DAQ) unit, together with a compatible computer system. Utilizing this device, the computer system, together with the DAQ unit is then placed in a pressurized, sealed capsule with watertight, high-power connections for the transmission line 206 to attach. The capsule may include a power converter to convert the line voltage to the operating voltage of the computing system. The DAQ unit may connect to a small data line, attached to the transmission line 206 such that the transmission line 206 connects a data port on one end of the line to another data port on the opposing end. Each DAQ unit may transmit pulses at regular intervals, and at the same time, monitor the data line for incoming pulses. Thus, when the lines break at any point, the pulses are be interrupted, and the monitoring devices 210 may transmit an error code through the network containing information detailing the segment of the break.

In an exemplary aspect of the disclosure, the system 200 may be a modular system, easily reconfigured with the drop-in addition of new generators 100, the movement of generators 100 from one hydrothermal vent 8 to another if the natural venting changes, or removal or replacement, e.g., of nonfunctional generators.

Of course, those skilled in the art will recognize that the generator 100 may be utilized in other suitable environments other than an undersea hydrothermal vent 8, and the generator 100 and the power transfer network 200 may be utilized separately or in conjunction. For example, the generator 100 may be utilized in any of innumerable systems as a substitute for a steam turbine, a heat engine, a stirling engine, etc.

The present disclosure may include a description of functional block components and various processing steps. Such functional blocks may be realized by any number of hardware or software components configured to perform the specified functions and achieve the various results. For example, the various heat exchangers may be employed, e.g., as a shell and tube, one or more conductive plates and/or fins, fluid heat exchangers, phase change heat exchangers such as a heat pipe, and the like, which may carry out a variety of functions. In addition, aspects of the disclosure may be practiced in conjunction with any number of heat engines, and the system described, utilizing a thermoacoustic resonance chamber, is merely one exemplary application. Further, any number of conventional techniques may be employed for generating electric energy from thermal energy in accordance with a temperature difference between the hydrothermal fluid and the ambient sea water, and the like.

Figure 9:
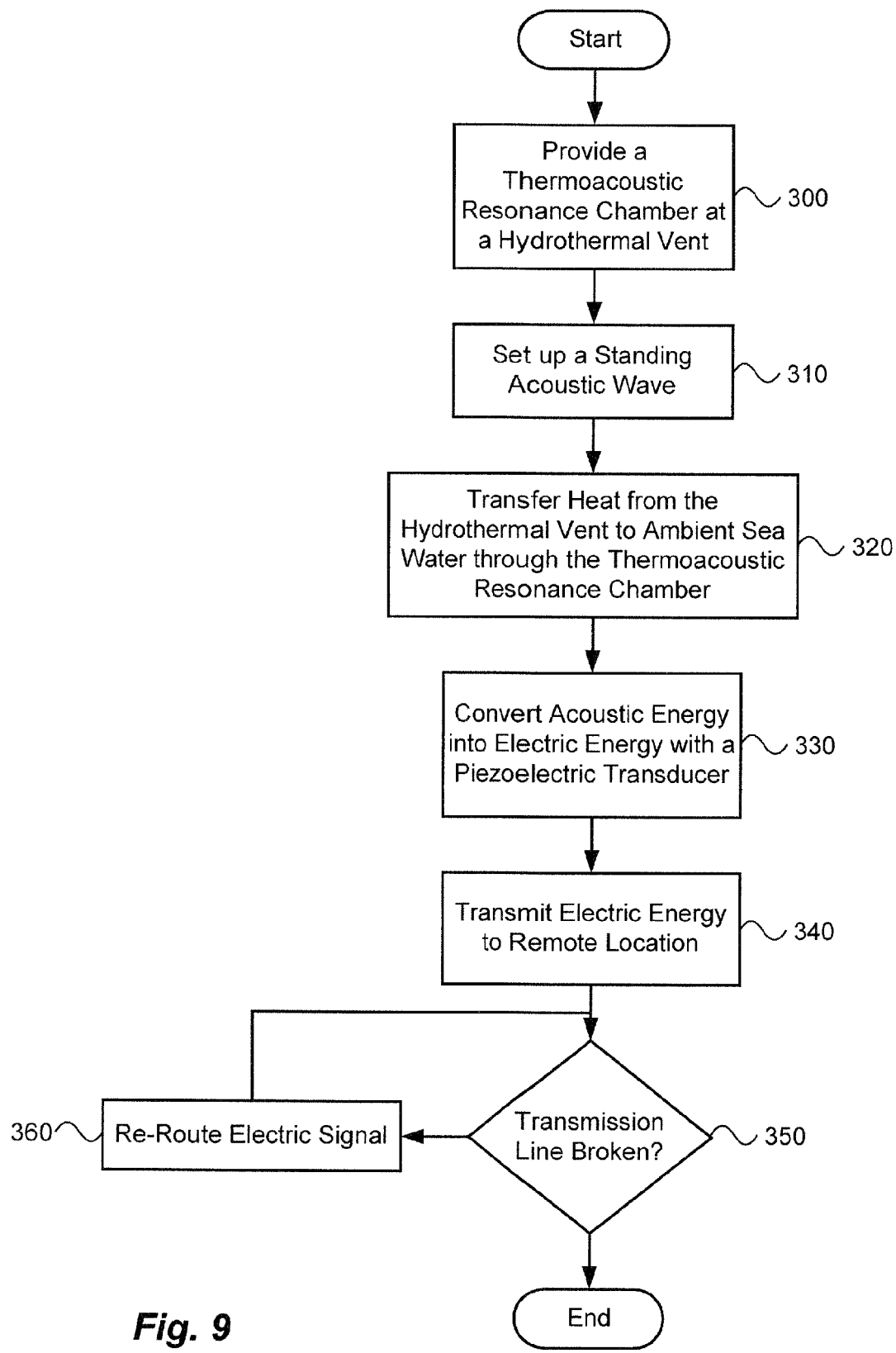
FIG. 9 is a flow chart illustrating a process of generating electric energy in accordance with an aspect of the disclosure.

FIG. 9 is a flow diagram of a process of generating electric energy in accordance with an exemplary aspect of the disclosure. In some embodiments the process is performed by circuitry or a network processor. In some embodiments the process is performed by the generator 100. In some embodiments the process is performed by the transmission system 200.

In block 300 the process does provides a thermoacoustic resonance chamber at a hydrothermal vent. In block 310 the process sets up a standing acoustic wave, for example, within the thermoacoustic resonance chamber. By way of the standing acoustic wave, in block 320, the process transfers heat from the hydrothermal vent to ambient sea water through the thermoacoustic resonance chamber. In block 330, the process converts acoustic energy into electric energy with a piezoelectric transducer, e.g., placed at a suitable location, e.g., at a pressure antinode, within the thermoacoustic resonance chamber. In block 340, the process transmits the electric energy to a remote location. In some embodiments the process transmits the electric energy to the remote location utilizing the transmission system 200 illustrated in FIG. 7.

In block 350, the process determines whether a transmission line has been broken, potentially compromising the transmission of the electric energy to the remote location. If the transmission line has been broken, in block 360, the process reroutes the electric energy to a non-broken portion, and may notify a utility that the line is in need of repair.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:

1. An electric generator comprising:
  a channel for directing a flow of a first fluid; and
  a thermoacoustic resonance chamber that penetrates the channel, comprising a first heat exchanger inside the channel and a second heat exchanger outside the channel, wherein
    the thermoacoustic resonance chamber has a toroidal shape configured to enclose a second fluid adapted to create a resonance of and carry an acoustic pressure wave to transfer heat between the first heat exchanger and the second heat exchanger;

the thermoacoustic resonance chamber comprises a plurality of channels to provide a plurality of resonance cavities capable of supporting standing thermoacoustic waves around the toroidal shape; and the plurality of channels are configured to partition the thermoacoustic resonance chamber into a plurality of tubular channels extending around the toroidal shape.

2. The electric generator of claim 1, wherein the channel is configured to be located in a hydrothermal vent such that the first fluid is a hydrothermal fluid emanating from the hydrothermal vent.

3. The electric generator of claim 2, wherein the second heat exchanger is configured to utilize ambient sea water as a heat sink.

4. The electric generator of claim 1, wherein the plurality of tubular channels each have a hexagonal cross-section.

5. The electric generator of claim 1, further comprising a piezoelectric transducer for transforming energy of the acoustic pressure wave into electrical energy.

6. The electric generator of claim 5, wherein the piezoelectric transducer is positioned at a location corresponding to a pressure antinode of a standing thermoacoustic wave set up by a transfer of heat energy between the first heat exchanger and the second heat exchanger.

7. The electric generator of claim 1, wherein the channel comprises a pipe having a diameter larger than a diameter of the thermoacoustic resonance chamber such that the flow of the first fluid is substantially unimpeded by the penetrating thermoacoustic resonance chamber.

8. The electric generator of claim 1, wherein the first and second heat exchangers each comprise:

a first portion inside the thermoacoustic resonance chamber configured to permit a thermoacoustic wave to travel through the respective first or second heat exchanger; and a second portion outside the thermoacoustic resonance chamber, wherein the first and second heat exchangers are each configured to conduct heat between their respective first portion and their respective second portion.

9. The electric generator of claim 8, wherein the first portions of the first and second heat exchangers each comprise a porous configuration having pores corresponding to a plurality of channels extending around a toroidal shape of the thermoacoustic resonance chamber.

10. The electric generator of claim 8, wherein the second portions of the first and second heat exchangers each comprise a plurality of fins extending outward from the thermoacoustic resonance chamber for increasing a surface area of the respective second portions.

11. The electric generator of claim 8, wherein at least a portion of each of the first and second heat exchangers is coated with a corrosion resistant material.

12. The electric generator of claim 8, wherein at least one of the first or second heat exchangers comprises a heat pipe configured to utilize a phase transition of a thermally conductive material to transfer heat from the first portion to the second portion.

13. The electric generator of claim 12, wherein the heat pipe comprises at least one of a porous portion or plurality of channels for moving the thermally conductive material from a cold side of the at least one of the first or second heat exchanger to a hot side of the at least one of the first or second heat exchanger by utilizing capillary action.

14. The electric generator of claim 8, wherein at least one of the first or second heat exchangers is configured due to the traveling thermoacoustic wave to vibrate for cleaning.

15. A system for generating electric energy, comprising:

a plurality of electric generators in accordance with claim 1;

a power line network coupling together each of the plurality of electric generators, to transmit the electric energy from the plurality of electric generators to a remote location along a plurality of transmission lines;

a plurality of sub-connectors for coupling together at least two of the plurality of transmission lines at a plurality of junctions along a length of the transmission lines; and a plurality of monitoring devices located at each junction between the sub-connectors and the transmission lines, for monitoring the transmission of the electric energy along the transmission lines.

16. A method of generating electric energy, comprising:

providing a heat engine at an undersea hydrothermal vent, the heat engine comprising a first heat exchanger thermally coupled to a hydrothermal fluid emanating from the hydrothermal vent and a second heat exchanger thermally coupled to ambient sea water;

setting up a standing acoustic wave in a thermoacoustic resonance chamber within the heat engine;

forming the thermoacoustic resonance chamber in a toroidal shape configured to enclose a second fluid adapted to create a resonance of and carry an acoustic pressure wave to transfer heat between the first heat exchanger and the second heat exchanger, wherein the thermoacoustic resonance chamber comprises a plurality of channels to provide a plurality of resonance cavities capable of supporting standing thermoacoustic waves around the toroidal shape;

configuring the plurality of channels to partition the thermoacoustic resonance chamber into a plurality of tubular channels extending around the toroidal shape; and converting thermal energy in accordance with a temperature difference between the hydrothermal fluid and the ambient sea water into electric energy.

17. The method of claim 16, further comprising:

utilizing a piezoelectric transducer to convert energy from the standing acoustic wave into the electric energy.

* * * * *